United States Patent [19]
Blaha

[11] 3,904,788
[45] Sept. 9, 1975

[54] METHOD OF PLACING MEMBRANE ON SUPPORT

[75] Inventor: Emil Blaha, Cheltenham, Pa.

[73] Assignee: Selas Corporation of America, Dresher, Pa.

[22] Filed: July 18, 1972

[21] Appl. No.: 272,765

[52] U.S. Cl. .................. 427/232; 118/52; 118/53; 210/500 M; 264/41; 264/270; 427/238; 427/240; 427/346
[51] Int. Cl.² .................. B05D 7/22; B29D 23/08
[58] Field of Search .................. 117/95, 101, 102 R; 118/52–56; 210/500 M; 264/41, 270

[56] References Cited
UNITED STATES PATENTS

| | | | |
|---|---|---|---|
| 1,530,614 | 3/1925 | Pleister | 117/101 |
| 1,653,255 | 12/1927 | Comp | 117/101 |
| 2,087,965 | 7/1937 | Cherrington | 117/101 |
| 2,165,936 | 7/1939 | Miller | 117/101 |
| 2,192,792 | 3/1940 | Kurtz | 75/22 |
| 2,356,553 | 8/1944 | Weissenberg | 117/101 |
| 2,923,640 | 2/1960 | Buckingham | 117/101 |
| 3,524,757 | 8/1970 | Havens | 117/95 |
| 3,544,358 | 12/1970 | Manjikian | 117/97 X |
| 3,563,791 | 2/1971 | Janco | 117/101 X |
| 3,581,900 | 6/1971 | Clark | 117/95 X |
| 3,647,521 | 3/1972 | Tulin | 117/95 |
| 3,657,402 | 4/1972 | Stana et al. | 117/95 X |
| 3,658,955 | 4/1972 | Chamberlin et al. | 117/95 X |
| 3,661,638 | 5/1972 | Lemecha | 117/101 X |

Primary Examiner—William D. Martin
Assistant Examiner—Stuart D. Frenkel

[57] ABSTRACT

The invention is directed to a method of placing a semipermeable membrane on the surface of a small diameter bore formed in a rigid, porous support which comprises placing liquid membrane material in the bore, holding the support by the end in which the membrane material was inserted and rotating the support to force the material axially through the bore by centrifugal force.

3 Claims, 3 Drawing Figures

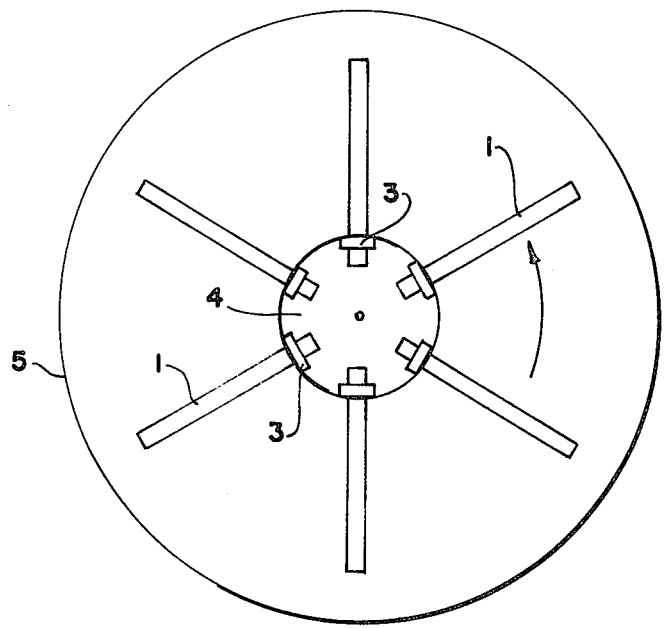
FIG. 1
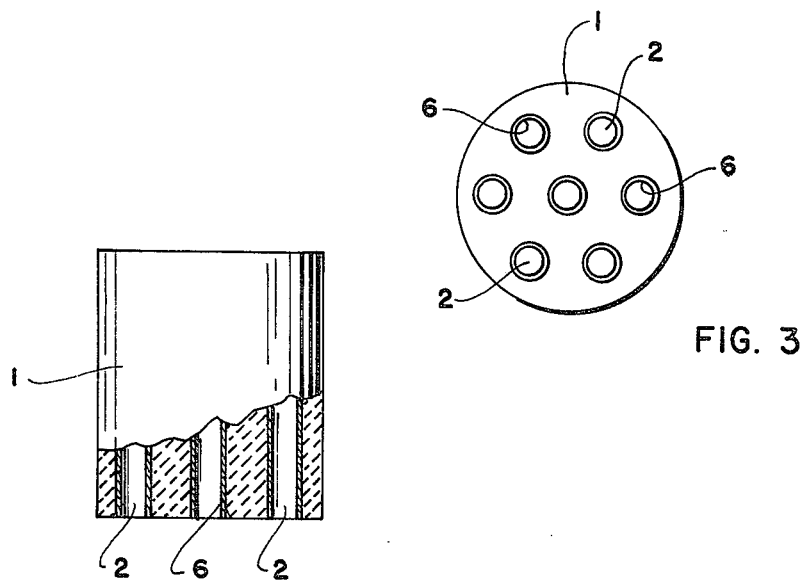
FIG. 2
FIG. 3

METHOD OF PLACING MEMBRANE ON SUPPORT

SUMMARY OF THE INVENTION

The present invention relates to semipermeable membranes, and more particularly to a method of placing such a membrane on a porous support.

Much work has been done in the preparation of cellulosic membranes and their supports for use in reverse osmosis apparatus. These membranes, in order to give a satisfactory flow, must be on the order of a thousandth of an inch thick and they must be supported by a porous support that is strong enough to withstand the differential pressure placed across them during operation. Since, even at best, the flow through the membrane is not large, it is desirable to have a support structure that has a large membrane area in as small a space as possible.

In practicing the present invention, the support is a multichannel, cylindrical member made of a porous ceramic. The channels or bores in the member are filled with a cellulosic material that will become the membrane. The support members are then rotated so that surplus material is thrown from the bores by centrifugal force to leave on the surface of the bores a membrane coating of the desired thickness.

It is an object of the invention to provide a method of placing a semipermeable membrane on a porous support.

The various features of novelty which characterize my invention are pointed out with particularly in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the Drawings:

FIG. 1 is a diagrammatic plan view of a centrifugal machine,

FIG. 2 is a view partly in section of a membrane and support therefor, and

FIG. 3 is an end view of the support of FIG. 2.

DETAILED DESCRIPTION

The support upon which the membrane is placed is preferably a cylindrical member 1 made of a porous porcelain. This material has sufficient strength to withstand the differential pressure applied to it, which pressure can be as high as 1500 p.s.i. Ceramic members 1 can be of any convenient length such as 18 inches long and are preferably about 0.410 inch in diameter. Each member is provided with a plurality of channels or bores, conveniently seven, extending axially thereof and which are about 0.085 inch in diameter.

The film or membrane forming composition comprises a cellulosic derivative, a solvent and a modifying agent. Such compositions are well known and in this invention it is preferred to use cellulose acetate dissolved in acetone with a modifier. The solution formed is a relatively viscous liquid which will not of its own accord flow through the small bores 2 to form a thin layer that will become a membrane upon precipitation.

In preparing the membrane, support 1 is first saturated with a non-precipitating liquid such as acetone, pyridine, or dioxane to prevent absorption by the pores of the ceramic of the solvent in the membrane-forming composition. The acetate solution is then injected into bores 2 of the support. A sufficient quantity is placed in each bore to form a layer on the surface thereof about 0.005 inch thick. The liquid solution is forced to travel through the entire length of the bore to coat it with a heavy layer of the solution. This can be done by the use of a non-precipitating liquid such as acetone under pressure or by air pressure. The result is a layer about 0.005 inch thick, which is too thick for a commercially practical membrane.

Supports having their bores coated as above are then subjected to the action of centrifugal force. To this end, the supports are each fastened by a fixture 3 to a rotatable plate 4 with the supports extending radially as shown in FIG. 1. The plate 4 with the supports 1 attached thereto is then rotated, preferably in a horizontal plane, by any suitable means. The surplus coating in the bores 2 is moved outwardly by centrifugal force thereby reducing the thickness of the coating. A circular screen 5 surrounds the rotating supports to catch the material thrown from them. If the supports are being rotated around a horizontal axis it may be well to rotate them around their own axes from time to time in order to insure that the liquid has a uniform thickness around the bore.

As noted above, the original coating of the viscous cellulose material is about 0.005 inch thick. Rotation of the supports at from 1200 to 1500 r.p.m. for about five minutes will cause the coating to be reduced to not more than 0.001 inch thick. Such a coating is shown, in exaggerated thickness, at 6 in FIGS. 2 and 3. The thus formed coating is cured into a membrane by circulating ice water through the bores 2 of the support to precipitate out the cellulose. The supports with the membranes formed on the surfaces of the bores are preferably kept moist until use so that the membranes will not dry out and shrink.

The method herein disclosed produces a semipermeable membrane permanently mounted on a porous support that is eminently suited for use in a reverse osmosis apparatus. The membrane so formed is thin enough to permit a relatively large flow through it. Although the pores of the ceramic support can be in the micron size, they are still so much larger than those in membrane 6 they result in no reduction in flow of the liquid. It is also noted that there is a large area of membrane surface in the small volume occupied by each support.

While in accordance with the provisions of the Statutes I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. The method of placing a semipermeable membrane on the surface of an elogated bore formed in an elongated porous, ceramic support which comprises forcing a relatively viscous liquid comprising a cellulosic derivative and a solvent through the bore to deposit on said surface a relatively thick layer of the liquid, holding the support adjacent to one end with the support extending radially to an axis, rotating said support around said axis thereby removing excess liquid from the bore by centrifugal force to substantially reduce the thickness of said layer of liquid, and precipitating the cellulosic derivative from said solvent to produce a cellulosic semipermeable membrane on said surface.

2. The method of claim 1 in which said support is cylindrical in shape and has a plurality of bores in it and in which the bores are treated simultaneously.

3. The method of claim 1 in which the liquid is forced through the bore by placing enough liquid to coat the bore in one end thereof and applying a pressure to said end of the bore thereby forcing the liquid through the same.

* * * * *